United States Patent
Lehman et al.

(10) Patent No.: US 6,872,278 B2
(45) Date of Patent: Mar. 29, 2005

(54) ONE PART WOODWORKING ADHESIVE COMPOSITION

(75) Inventors: Nicholas C. Lehman, Maple Grove, MN (US); Scott W. Rhein, Forest Lake, MN (US); John T. Anderson, Mahtomedi, MN (US)

(73) Assignee: H.B. Fuller Licensing & Financing, Inc., St. Paul, MN (US)

( * ) Notice: Subject to any disclaimer, the term of this patent is extended or adjusted under 35 U.S.C. 154(b) by 17 days.

(21) Appl. No.: 10/259,114

(22) Filed: Sep. 26, 2002

(65) Prior Publication Data

US 2004/0003893 A1 Jan. 8, 2004

Related U.S. Application Data

(63) Continuation-in-part of application No. 10/191,768, filed on Jul. 8, 2002, now abandoned.

(51) Int. Cl.[7] .................. C09J 131/02; C09J 131/04; B32B 27/28; C08G 63/00
(52) U.S. Cl. ................... 156/327; 156/332; 156/330.9; 428/500; 428/507; 428/511; 428/514; 428/515; 523/201; 525/64; 525/66; 525/70; 525/78; 525/80; 525/242; 525/243; 525/244; 525/300; 525/302; 525/902
(58) Field of Search ............................. 525/64, 66, 70, 525/78, 80, 242, 243, 244, 300, 302, 902; 428/500, 507, 511, 514, 515; 523/201; 156/327, 332, 330.9

(56) References Cited

U.S. PATENT DOCUMENTS

| | | |
|---|---|---|
| 3,562,235 A | 2/1971 | Ryan |
| 3,787,522 A | 1/1974 | Dickie |
| 4,107,120 A | 8/1978 | Plamondon et al. |
| 4,351,875 A | 9/1982 | Arkens |
| 4,942,086 A | 7/1990 | Mudge et al. |
| 4,948,822 A | 8/1990 | Iovine et al. |
| 5,190,997 A | 3/1993 | Lindemann et al. |
| 5,225,278 A | 7/1993 | Kielbania, Jr. et al. |
| 5,360,826 A | 11/1994 | Egolf et al. |
| 5,439,960 A | 8/1995 | Mudge et al. |
| 5,461,125 A | 10/1995 | Lu et al. |
| 5,545,684 A | 8/1996 | Jakob et al. |
| 5,777,015 A | 7/1998 | Jakob et al. |
| 5,889,107 A | 3/1999 | Jakob et al. |
| 5,907,011 A | 5/1999 | Jakob et al. |
| 5,932,647 A * | 8/1999 | Schilling et al. ............. 524/503 |
| 6,093,766 A | 7/2000 | Jakob et al. |
| 6,262,169 B1 | 7/2001 | Helmer et al. |
| 6,284,321 B1 | 9/2001 | Brindoepke et al. |
| 6,294,249 B1 | 9/2001 | Hamer et al. |
| 6,337,131 B1 | 1/2002 | Rupaner et al. |
| 6,489,391 B1 * | 12/2002 | Schilling et al. ............. 524/503 |
| 6,552,115 B1 * | 4/2003 | Zecha et al. ................. 524/457 |
| 2001/0034308 A1 | 10/2001 | Krull et al. |
| 2001/0034400 A1 | 10/2001 | Mestach |
| 2001/0034410 A1 | 10/2001 | Krull et al. |

FOREIGN PATENT DOCUMENTS

EP    1 170 311    1/2002

OTHER PUBLICATIONS

Machine Translation of JP 10–121017, Kimata et al. May 1998, obtained from JPO website.*
DIN EN–204, "Classification of Non–Structural Adhesives for Joining Wood and Wood–Based Panel Products," (Oct. 1991) (4 pages).
European Standard EN 205 (1991) (7 pages).
WATT 91 (Wood Adhesives Temperature Test) Test Method for Wood Adhesives for Non–Structural Applications, Determination of the Hot Tensile Strength of Lap Joints Test Method (5 pages).

* cited by examiner

*Primary Examiner*—Jeffrey B. Robertson

(57) ABSTRACT

An adhesive composition that includes a) an emulsion that includes a multi-stage polymer that includes a first stage polymer having a Tg from −20° C. to 90° C. and including from about 0.5% by weight to about 3% by weight latent crosslinking monomer based on the first stage monomer weight, and a second stage polymer having a Tg from 40° C. to 140° C., the second stage polymer being different from the first stage polymer, b) formaldehyde-based crosslinking agent, and c) catalyst, the composition being capable of passing the DIN EN 204 Test Method.

44 Claims, No Drawings

ONE PART WOODWORKING ADHESIVE COMPOSITION

REFERENCE TO RELATED APPLICATIONS

This is a continuation-in-part of U.S. application Ser. No. 10/191,768 filed Jul. 8, 2002 now abandoned.

BACKGROUND

The invention relates to a one-part woodworking adhesive composition.

Woodworking adhesive compositions often are supplied as two part systems. Usually at least two components of the system cannot be stored together because they tend to crosslink too quickly to be suitable for later use. As a result, the end user must combine the two parts of the system to prepare the adhesive composition. The additional steps required to combine and mix the components of the two part system tend to complicate and lengthen the manufacturing process. Two part adhesive systems also require the end user to mix two components together in specified ratios to obtain an adhesive composition with predetermined properties and performance characteristics. Performance problems can arise if the proper amount of each component is not used.

The woodworking industry has had a long-standing goal to develop a one part adhesive composition for use in bonding wood substrates that exhibits good stability and can pass industry standards. Available one part wood working adhesive compositions tend to lack sufficient water resistance for many applications.

SUMMARY

The invention features a stable one part adhesive composition suitable for bonding wood substrates.

In one aspect, the invention features an adhesive composition that includes a) an emulsion including a multi-stage polymer including a first stage polymer having a Tg from −20° C. to 90° C. and including from about 0.5% by weight to about 3% by weight latent crosslinking monomer based on the first stage monomer weight, and a second stage polymer having a Tg from 40° C. to 140° C., the second stage polymer being different from the first stage polymer, and b) formaldehyde-based crosslinking agent, and c) catalyst, the adhesive composition being capable of passing the DIN EN 204 Test Method.

In one embodiment, the adhesive composition passes the WATT-91 Test Method. In some embodiments, the adhesive composition passes the WATT-91 Test Method after aging in a sealed container for at least 30 days at 23° C. In other embodiments, the adhesive composition passes the WATT-91 Test Method after aging in a sealed container for at least 2 months at 23° C. In another embodiment, the adhesive composition passes the DIN EN 204 Test Method after aging in a sealed container for at least 2 months at 23° C. In some embodiments, the adhesive composition passes the WATT-91 Test Method after aging in a sealed container for at least 6 months at 23° C. In other embodiments, the adhesive composition, after aging for at least 2 months at 23° C., passes the DIN EN 204 Test Method and the WATT-91 Test Method. In one embodiment, the adhesive composition, after aging for at least 3 months at 23° C., passes the DIN EN 204 Test Method and the WATT-91 Test Method. In other embodiments, the adhesive composition, after aging for at least 6 months at 23° C., passes the DIN EN 204 Test Method and the WATT-91 Test Method.

In some embodiments, the second stage polymer includes from about 0.1% by weight to about 10% by weight latent crosslinking monomer based on the second stage monomer weight.

In other embodiments, the catalyst is an acid catalyst. In some embodiments the catalyst is selected from the group consisting of hydrochloric acid, sulfuric acid, phosphoric acid, p-toluene sulfonic acid, and combinations thereof. In one embodiment, the catalyst is a Lewis acid. In another embodiment, the catalyst is selected from the group consisting of aluminum chloride, iron chloride, zirconium oxychloride, chromic nitrate, chromic perchlorate, aluminum nitrate, iron nitrate and zinc nitrate.

In one embodiment, the first stage polymer has a Tg from 0° C. to 70° C. In other embodiments, the first stage polymer has a Tg from 20° C. to 50° C. In some embodiments, the first stage polymer includes vinyl ester. In other embodiments, the first stage polymer includes vinyl acetate. In one embodiment, the first stage polymer further includes vinyl ester other than vinyl acetate. In another embodiment, the first stage polymer further includes vinyl ester of versatic acid.

In some embodiments, the second stage polymer has a Tg from 60° C. to 120° C. In other embodiments, the second stage polymer has a Tg from 80° C. to 120° C. In another embodiment, the second stage polymer includes methyl methacrylate. In some embodiments, the second stage polymer includes styrene, acrylonitrile, vinyl pivalate, or a combination thereof.

In another embodiment, the multi-stage polymer comprises from 0.5% by weight to 60% by weight second stage polymer based on the weight of the first-stage polymer. In other embodiments, the multi-stage polymer comprises from 1% by weight to about 30% by weight second stage polymer based on the weight of the first stage polymer. In some embodiments, the multi-stage polymer comprises from 1% by weight to 10% by weight second stage polymer based on the weight of the first-stage polymer.

In other embodiments, the adhesive composition further includes coalescing agent, urea, alcohol, plasticizer, antifoam, filler, biocide, tackifier, fire retardant, thickener, preservative, or a combination thereof.

In one embodiment, the first-stage polymer includes from about 1% by weight to about 2.5% by weight latent crosslinking monomer based on the first stage monomer weight. In other embodiments, the first-stage polymer includes from about 1% by weight to about 2% by weight latent crosslinking monomer based on the first stage monomer weight.

In some embodiments, the formaldehyde-based crosslinking agent is selected from the group consisting of resorcinol formaldehyde, urea-formaldehyde, melamine-formaldehyde, phenol-formaldehyde, trimethylol phenol, acrylamide-formaldehyde adducts, and combinations thereof. In other embodiments, the composition includes from about 1% by weight to about 10% by weight formaldehyde-based crosslinking agent.

In one embodiment, the adhesive composition further includes alcohol.

In another aspect, the invention features an adhesive composition that includes a) an emulsion including a multi-stage polymer including a first stage polymer having a Tg from −20° C. to 90° C., a second stage polymer having a Tg from 40° C. to 140° C., the second stage polymer being different from the first stage polymer, and latent cross linking monomer, b) formaldehyde-based crosslinking agent, and c) catalyst, the adhesive composition being capable of passing the DIN EN 204 Test Method after having been stored in a sealed container at 23° C. for at least 30 days.

In another aspect, the invention features an article that includes a substrate, and an adhesive composition including the reaction product of a) an emulsion including a multi-stage polymer including a first stage polymer having a Tg from −20° C. to 90° C. and including from about 0.5% by weight to about 3% by weight latent crosslinking monomer based on the first stage monomer weight, and a second stage polymer having a Tg from 40° C. to 140° C., the second stage polymer being different from the first stage polymer, b) formaldehyde-based crosslinking agent, and c) catalyst, the adhesive composition being capable of passing the DIN EN 204 Test Method.

In one embodiment, the substrate includes wood.

In some embodiments, the article includes a second substrate, the first substrate being bonded to the second substrate through the adhesive composition.

In other aspects, the invention features an article that includes a substrate, and an adhesive composition including the reaction product of a) an emulsion including a multistage polymer including a first stage polymer having a Tg from −20° C. to 90° C., a second stage polymer having a Tg from 40° C. to 140° C., the second stage polymer being different from the first stage polymer, and latent crosslinking monomer, b) formaldehyde-based crosslinking agent, and c) catalyst, the adhesive composition being capable of passing the DIN EN 204 Test Method after aging in a sealed container at 23° C. for 30 days.

In another aspect, the invention features a method of bonding substrates, the method including a) contacting a first substrate with an adhesive composition described herein and b) contacting the adhesive composition with a second substrate.

In one embodiment, the method further includes applying pressure to the substrate construction to bond the first substrate to the second substrate through the adhesive composition. In some embodiments, the method further includes applying heat to the substrate construction. In some embodiments, the method further includes applying radio frequency to the substrate construction.

The invention features a woodworking adhesive composition that can be formulated for use as a one part woodworking adhesive composition that exhibits good shelf life stability, forms a good bond to wood substrates, and maintains good adhesion in high humidity environments and at elevated temperatures.

Glossary

The term "$T_g$" or "glass transition temperature" means the temperature at which a polymer exhibits a phase change from glassy, brittle solid to a liquid. "$T_g$" as referred to herein is calculated using a Differential Scanning Calorimeter according to P. Peyser, Naval Research Laboratory, Washington, D.C., *Polymer Handbook,* Third Edition, Section VI, "Solid State Properties," John Wiley & Sons, New York pp. 209–279 (1989).

The term "polymer" refers to homopolymers, copolymers, multipolymers and polymers in any form.

The term "multi-stage polymer" means a polymer that includes at least a first polymer formed in a first polymerization process and at least a second polymer, compositionally different from the first polymer, formed in a second polymerization process.

The term "latent crosslinking monomer" means a monomer that includes at least one reactive functional group that remains essentially intact during formation of the emulsion polymer and provides a reactive site on the emulsion polymer that can subsequently be reacted under different reaction conditions, e.g., elevated temperature or drying of the emulsion.

Other features of the invention will be apparent from the following description of the preferred embodiments thereof, and from the claims.

DETAILED DESCRIPTION

The adhesive composition includes an emulsion comprising a multi-stage polymer that includes a first stage polymer having a Tg of from −20° C. to 90° C., and a second stage polymer that is different from the first stage polymer and that has a Tg of from 40° C. to 140° C., latent crosslinking monomer, formaldehyde-based crosslinking agent, and catalyst.

The adhesive composition is well suited to woodworking and to bonding wood substrates. The adhesive composition preferably exhibits at least 10 N/mm when tested according to DIN EN-204 Durability Class D4, Conditioning Sequence 1, at least 4 N/mm$^2$ when tested according to the DIN EN-204 Durability Class D4, Conditioning Sequence 3, at least 4 N/mm$^2$ when tested according to the DIN EN-204 Durability Class D4, Conditioning Sequence 5, or a combination thereof. Preferably the adhesive composition passes DIN EN-204 entitled, "Classification of Non-Structural Adhesives for Joining Wood and Wood-Based Panel Products," Durability Class D4, Conditioning Sequences 1, 3 and 5 (October 1991) (herein after referred to as "The DIN EN-204 Test Method").

The composition can also be formulated to pass WATT 91 (Wood Adhesives Temperature Test) Test Method for Wood Adhesives for Non-Structural Applications, Determination of the Hot Tensile Strength of Lap Joints Test Method.

Preferably the adhesive composition passes both the DIN EN-204 Test Method and the WATT-91 Test Method.

The adhesive composition also exhibits good storage stability such that it maintains adhesive bonding properties over its useful shelf life. The adhesive composition preferably is free flowing (i.e., can be poured as is or can be poured after stirring) and remains free of coagulation (i.e., irreversible increase in viscosity rendering the composition incapable of being applied to a wood substrate) over its shelf life. Preferably the adhesive composition is sufficiently stable to pass the DIN EN 204 test method, the WATT-91 test method or both over the shelf life of the composition, preferably after having been stored in a sealed container at 23° C. for at least 30 days, more preferably for at least 2 months, more preferably for at least 3 months, most preferably for at least 6 months.

The multi-stage polymer of the adhesive composition is in the form of an emulsion polymer that includes at least two compositionally different polymers. The polymers can be present in the emulsion in a variety of configurations. Useful methods of making multi-stage polymers are described in, e.g., U.S. Pat. Nos. 3,562,235 and 3,787,522, and incorporated herein. One example of a multi-stage polymer is a core-shell polymer that includes a polymer core and a second polymer disposed on the surface of the polymer core. In one embodiment, the emulsion polymer can be formulated such that the second polymer at least partially surrounds the polymer core. In other embodiments, the emulsion polymer can be formulated such that the second polymer completely surrounds the polymer core.

The multi-stage polymer can be prepared by various emulsion polymerization processes including, e.g., batch, semi-continuous and continuous emulsion polymerization processes. Examples of such procedures are described in U.S. Pat. Nos. 5,439,960, 2,754,280, 2,795,564, and 3,732,184, and incorporated herein.

One example of a suitable two stage emulsion polymerization process includes a first stage in which a first stage polymer is prepared by emulsion polymerizing a vinyl monomer and a latent crosslinking monomer in the presence of a stabilizing agent to produce a stabilized polymer having a Tg from −20° C. to 90° C., preferably from 0° C. to 70° C., more preferably from 20° C. to 50° C., and a second stage in which a second stage polymer is prepared by emulsion polymerizing a monomer having a Tg of at least 40° C. (such monomers are often referred to as "hard monomers"), in the presence of the first stage monomer, and optionally in the presence of a latent crosslinking monomer, to produce a second stage polymer having a Tg from 40° C. to 140° C., preferably from 60° C. to 120° C., more preferably from 80° C. to 120° C.

Suitable polymers for the first stage emulsion polymer include, e.g., homo- and copolymers of polyvinyl ester monomers and mixtures thereof. Suitable fist stage vinyl ester monomers include, e.g., include vinyl formate, vinyl acetate, vinyl propionate, vinyl isobutyrate, vinyl pivalate, vinyl 2-ethylhexanoate, vinyl esters of saturated, branched monocarboxylic acids having from 9 to 10 carbon atoms in the acid radical, vinyl esters of long-chain (e.g., from 10 to 20 carbon atoms) branched and unbranched, saturated and unsaturated fatty acids (e.g., vinyl laurate, vinyl stearate, vinyl esters of benzoic acid, and substituted derivatives of benzoic acid (e.g., vinyl p-tert-butylbenzoate)) and combinations thereof. Suitable vinyl ester monomers also include the vinyl esters of vinyl alcohol (i.e., versatic acid) available under the VEOVA series of trade designations from Shell Chemical Company (Houston, Tex.) including VEOVA 5 vinyl ester of a 5 carbon neoacid, VEOVA 9 vinyl ester of a 9 carbon neo-acid, VEOVA 10 vinyl ester of a 10 carbon neo-acid, and VEOVA 11 vinyl ester of an 11 carbon neo-acid.

Useful first stage emulsion polymers include from about 5% by weight to 100% by weight vinyl ester, preferably from about 5% by weight to about 40% by weight vinyl ester, more preferably from 5% by weight to 20% by weight vinyl ester based on first stage polymer weight, and from 0% by weight to 99% by weight vinyl acetate, preferably from about 65% by weight to about 95% by weight vinyl acetate, more preferably from about 75% by weight to about 95% by weight vinyl acetate based on first stage polymer weight.

Other monomers can be copolymerized with the vinyl ester monomer including, e.g., other ethylenically unsaturated monomers that can be copolymerized with vinyl esters including, e.g., α,β-unsaturated acids including, e.g., acrylic acid, methacrylic acid and esters thereof with primary and secondary saturated, monohydric alcohols having from 1 to 18 carbon atoms, e.g., methanol, ethanol, propanol, butanol, 2-ethylhexyl alcohol, cycloaliphatic alcohols and relative long chain (e.g., from 10 to 20 carbon atoms) fatty alcohols (e.g., stearyl alcohol and lauryl alcohol), α,β-unsaturated dicarboxylic acids including, e.g., maleic acid, fumaric acid, itaconic acid, and citraconic acid, mono- and diesters thereof with saturated monohydric, aliphatic alcohols having from 1 to 18 carbon atoms. These monomers can be present in the polymer in an amount of no greater than 25% by weight, preferably from 0.1% by weight to 15% by weight based on the first stage monomer weight.

Other suitable comonomers for the first stage emulsion polymer include ethylenically unsaturated hydrocarbons including, e.g., ethylene and a-olefins having form 3 to 18 carbon atoms including, e.g., propylene and butylene, styrene, vinyltoluene, vinylxylene, and halogenated, unsaturated, aliphatic hydrocarbons including, e.g., vinyl chloride, vinyl fluoride, vinylidene chloride and vinylidene fluoride. These monomers can be present in the polymer in an amount of no greater than 50% by weight, preferably from 0.1% by weight to about 25% by weight based on the first stage monomer weight.

The latent crosslinking monomer present in the first stage emulsion is a crosslinking monomer that includes reactive groups that are available for activation after the multi-stage emulsion polymer is formed. Examples of suitable latent crosslinking monomers include acrylamide, n-methyl acrylamide, isobutyl methoxy acrylamide, N-alkylolamides of alpha, beta ethylenically unsaturated carboxylic acids having 3–10 carbons, such as N-methylol acrylamide, N-ethanol acrylamide, N-propanol acrylamide, N-methylol methacrylamide, methylol acrylamidoglycolate methyl ether, N-ethanol methacrylamide, N-methylol maleamide, N-methylol maleamide, N-methylol maleamic acid, N-methylol maleamic acid esters, the N-alkylol amides of the vinyl aromatic acids, such as N-methylol-p-vinylbenzamide; N-(alkoxymethyl) acrylates and methacrylates, where the alkyl group has from 1–8 carbon atoms, such as N-(methoxymethyl) acrylamide, N-(butoxymethyl) acrylamide, N-(methoxymethyl) methacrylamide, N-(butoxymethyl) allyl carbamate and N-(methoxymethyl) allyl carbamate, and mixtures of these monomers with allyl carbamate, acrylamide or methacrylamide, and combinations thereof.

The amount of latent crosslinking monomer present the in the first stage emulsion polymer is from about 0.1% by weight to about 3% by weight, preferably from about 0.5% by weight to about 2% by weight, more preferably from about 1% by weight to about 2% by weight based on the first stage monomer weight.

The first stage emulsion polymerization is carried out in the presence of a stabilizing agent (i.e., an agent capable of stabilizing the emulsion). Examples of suitable stabilizing agents include protective colloids and surfactants. Examples of suitable protective colloids include polyvinyl alcohol, polyvinyl ethers, polysaccharides including, e.g., hydroxyethyl cellulose, carboxymethylcellulose, carboxymethyl starch, hydroxypropyl cellulose, hydroxypropyl methylcellulose, polyvinylpyrrolidone, polycarboxylic acids (e.g., polyacrylic acid), copolymers of maleic acid or maleic anhydride, and combinations thereof.

The protective colloid, when present, preferably is present in the first stage emulsion in an amount of from 0.5% by weight to about 15% by weight, preferably from about 1% by weight to about 10% by weight based on the first stage monomer weight.

Examples of useful surfactants include nonionic, anionic and cationic surfactants. Suitable nonionic surfactants include alkylphenoxypolyethoxyethanols having alkyl groups of about 7 to 18 carbon atoms and 10 to 60 or more oxyethylene units including, e.g., octylphenoxypolyethoxyethanols, methyloctylphenoxypolyethoxyethanols, nonylphenoxypolyethoxyethanols, and dodecylphenoxypolyethoxyethanols, ethylene oxide derivatives of long chained carboxylic acids including, e.g., lauric, myristic, palmitic, oleic, and stearic acid, containing 10 to 60 oxyethylene units per molecule, ethylene oxide condensates of long-chained alcohols including, e.g., octyl, decyl, lauryl, stearyl and cetyl alcohols, ethylene oxide derivatives of etherified or esterified polyhydroxy compounds having a hydrophobic component including lauric, myristic, palmitic, oleic, and stearic acid, containing 10 to 60 oxyethylene units per molecule, ethylene oxide condensates of long-chained alcohols including, e.g., octyl, decyl, lauryl, stearyl, and cetyl alcohols, ethylene oxide derivatives of etherified or esterified polyhydroxy compounds having a hydrophobic hydrocarbon chain, including, e.g., sorbitan monostearate containing 10 to 60 oxyethylene units, and block copolymers of ethylene oxide and propylene oxide that include a hydrophobic propylene oxide section combined with one or more hydrophilic ethylene oxide sections. Suitable anionic surfactants include higher fatty alcohol sulfates including, e.g., sodium lauryl sulfate, alkylaryl sulfonates (e.g., sodium salt of t-octylphenyl sulfonate, the sodium dioctyl sulfosuccinates, and disodium fatty alkyl alkanolamide sulfosuccinate), and the ammonium salt of a sulfate or phosphate ester of an alkylphenoxy poly(ethyleneoxy) ethanol, where the oxyethylene content is from 3 to 30 moles per alkylphenol. Suitable cationic surfactants include, e.g., N-dodecyl trimethyl ammonium chloride, and N-vinyl benzyl trimethyl ammonium chloride. The surfactant can be present in the first stage emulsion in an amount of from 0% by weight to about 10% by weight, more particularly from about 1% by weight to about 6% by weight based on the first stage monomer weight.

The emulsion polymerization process for forming the second stage emulsion polymer occurs in the presence of the first stage emulsion polymer. Useful second stage monomers for forming the second stage emulsion polymer include monomers having a Tg from 40° C. to 140° C., preferably from 60° C. to 120° C., more preferably from 80° C. to about 120° C. Examples of suitable second stage monomers include methyl methacrylate, styrene, acrylonitrile, vinyl pivalate, copolymers of methyl methacrylate $C_2$–$C_4$ methacrylates (e.g., methyl methacrylate, ethyl methacrylate, propyl methacrylate and butyl methacrylate), and combinations thereof. Preferably the emulsion polymer of the second stage includes from about 0.5% by weight to about 100% by weight methyl methacrylate, more preferably from about 50% by weight to about 100% by weight methyl methacrylate, more preferably from about 75% by weight to about 100% by weight methyl methacrylate.

The amount of second stage polymer in the multi-stage emulsion polymer is from about 0.5% by weight to about 60% by weight, preferably from about 1% by weight to about 15% by weight, more preferably from about 1% by weight to about 10% by weight based upon the first stage monomer weight.

Latent crosslinking monomers suitable for use in the second stage emulsion polymerization process include the latent crosslinking monomers set forth above and incorporated herein. The latent crosslinking monomer is preferably present in the second stage emulsion polymer in an amount of from about 0.1% by weight to about 10% by weight, preferably from about 0.5% by weight to about 5% by weight, more preferably from about 0.5% by weight to about 2% by weight based on the second stage monomer weight.

The multi-stage polymer can also include other comonomers including, e.g., polyethylenically unsaturated monomers, monomers having N-functional groups, hydroxy-functional monomers, and combinations thereof.

Suitable polyethylenically unsaturated monomers include, e.g., diallyl phthalate, diallyl maleate, triallyl cyanurate, tetraallyloxyethane, divinylbenzne, butanediol 1,4-dimethacrylate, triethylene glycol dimethacrylate, divinyl adipate, allyl(meth)acrylate, vinyl crotonate, methylenebisacrylamide, hexanediol diacrylate, pentaerythritol diacrylate, trimethylolpropane triacrylate, and combinations thereof. The amount of polyethylenically unsaturated monomer present in the polymer is preferably no greater than 10% by weight, more preferably from about 0.01 to about 2% by weight based on the second stage monomer weight.

Suitable monomers having N-functional groups include, e.g., allyl carbamate, acrylonitrile, N-methylolallyl carbamate N-vinylformamide, N-vinylpyrrolidone, and combinations thereof. The amount of monomers having N-functional groups present in the polymer is preferably no greater than 15% by weight, more preferably from about 0.01% by weight to about 10% by weight based on the second stage monomer weight.

Suitable hydroxy-functional monomers include, e.g., hydroxyethyl (meth)acrylate, hydroxypropyl (meth)acrylate and adducts thereof with ethylene oxide, propylene oxide and combinations thereof. The amount of hydroxy-functional monomer present in the emulsion polymer preferably is no greater than 25% by weight, more preferably from about 0.01to about 15% by weight based on the second stage monomer weight.

Useful formaldehyde-based crosslinking agents include, e.g., resorcinol formaldehyde, urea-formaldehyde, melamine-formaldehyde, phenolics including, e.g., phenol-formaldehyde and trimethylol phenol, and acrylamide-formaldehyde adducts and combinations thereof. Useful formaldehyde-based crosslinking agents are available from a variety of commercial suppliers including, e.g., Ashland Specialty Chemical Company (Dublin, Ohio), Borden Chemical, Inc. (Columbus, Ohio), Cytec Inc. (West Paterson, N.J.), and Georgia-Pacific Corporation (Atlanta, Ga.)

The amount of formaldehyde-based crosslinking agent present in the adhesive composition is from about 0.1% by weight to about 10% by weight, more preferably from about 1% by weight to about 6% by weight, most preferably from about 2% by weight to about 4% by weight based on the weight of the adhesive composition.

One example of a useful class of catalysts is strong acid catalysts including, e.g., organic acids, inorganic acids and Lewis acids. Suitable strong acid catalysts include, e.g., aluminum chloride, iron chloride, zirconium oxychloride, chromic nitrate, chromic perchlorate, aluminum nitrate, iron nitrate, zinc nitrate, hydrochloric acid, sulfuric acid, phosphoric acid, and paratoluene sulfonic acid, and combinations thereof.

The catalyst is present in the adhesive composition in an amount of from about 0.1% by weight to about 6% by weight, preferably from about 1% by weight to about 5% by weight, more preferably from about 1% by weight to about 4% by weight based on the weight of the adhesive composition.

The adhesive composition can optionally include a coalescing agent, which assists in coalescing the emulsion polymer particles. Examples of suitable coalescing agents include butyl carbitol acetate (i.e., diethylene glycol monobutyl ether acetate), glycol ethers, ether alcohols including, e.g., mono alkyl ether alcohols including, e.g., diethylene glycol $C_{1-6}$ mono- or dialkyl ethers, diethylene glycol ethyl ether, diethylene glycol butyl ether, dipropylene glycol methyl ether, tripropylene glycol ethyl ether, propylene glycol ethyl ether, glycol ether, triethylene glycol ethyl ether, isobutyrate, benzyl alcohol, 3-methoxybutanol-1, monomethyl, monoethyl and monobutyl ethers of diethylene glycol, triethylene glycol, dipropylene glycol and tripropylene glycol, benzyl alcohol, isophorone, methoxybutanol, and combinations thereof. Useful commercially available coalescing agents include, e.g., the coalescing agents available under the TEXANOL trade designation from Eastman (Kings Port, Tenn.).

If a coalescing agent is present in the adhesive composition, it is preferably present in the adhesive composition in an amount of no greater than about 5% by weight, preferably from about 0.1% by weight to about 3% by weight, more preferably from about 0.5% by weight to about 1.5% by weight based on the weight of the adhesive composition.

The adhesive composition can optionally include alcohol. Suitable alcohols include, e.g., isopropanol, methanol, and ethanol, and combinations thereof. If alcohol is present in the composition, it is preferably present in an amount of from about 0.1% by weight to about 5% by weight, more preferably from about 0.1% by weight to about 3% by weight, more preferably from about 0.5% by weight to about 1.5% by weight based on the weight of the adhesive composition.

The adhesive composition may also include other additives including, e.g., plasticizers, antifoams, fillers, biocides, tackifiers, fire retardants, thickeners, preservatives, and combinations thereof.

The adhesive composition is formulated to exhibit an acidic pH, preferably a pH from 2 to 6, more preferably a pH from 2.5 to 4.

The adhesive composition can be used to bond a variety of substrates including, e.g., wood, e.g., solid wood substrates, particle board, fiber board, chip board, hard board, oriented strand board, plywood, laminates, other cellulose-based substrates including, e.g., paper, and combinations thereof.

The substrates can be bonded to each other through the adhesive composition according to a variety of mechanisms and processes including, e.g., pressure (e.g., cold clamp and hot press), heat, radio frequency curing, and combinations thereof.

The invention will now be described further by way of the following examples. All parts, ratios, percents and amounts stated in the Examples are by weight unless otherwise specified.

EXAMPLES

Test Procedures

Test procedures used in the examples include the following.

The DIN EN-204 Test Method

The durability of the adhesive bond formed between two wood substrates is determined according to DIN EN-204 entitled, "Classification Of Non-Structural Adhesives For Joining Wood And Wood-Based Panel Products," Durability Class D4, Conditioning Sequences 1, 3 and 5 (October 1991). The samples are prepared according to European Standard EN 205 (1991).

The composition passes the DIN EN-204 test method if it achieves a value of at least 10.0 N/mm$^2$ under Conditioning Sequence 1, at least 4.0 N/mm$^2$ under Conditioning Sequence 3, and at least 4.0 N/mm$^2$ under Conditioning Sequence 5.

The WATT-91 Test Method

The durability of the adhesive bond formed between two wood substrates is determined according to the WATT 91 (Wood Adhesives Temperature Test) Test Method for Wood Adhesives for Non-Structural Applications, Determination of the Hot Tensile Strength of Lap Joints Test Method.

The composition passes the WATT-91 test method if it achieves a value of at least 7.0 N/mm$^2$.

Example 1

Stage 1: The first stage polymer emulsion was prepared by adding the following components to a glass reactor equipped with a water bath for heating and cooling, an agitator, a condenser and appropriate feed apparatus: 20.8 parts of deionized water, 1.7 parts 92% hydrolyzed polyvinyl alcohol, 1.1 parts 88% hydrolyzed polyvinyl alcohol, 0.04 parts buffer and 0.04 parts defoamer. The reactor was heated until the polyvinyl alcohol was fully dissolved and then the temperature adjusted to 65° C. The polymerization was initiated with the addition of 10.6 parts vinyl acetate, 4.5 parts VEOVA 10 vinyl ester of a 10 carbon neo-acid (Shell Chemical Company, Houston, Tex.), 0.46 parts N-methylolacrylamide, 0.06 parts dioctyl ester of sodium sulfosuccinic acid (Cytec Inc., West Paterson, N.J.) and 0.5 parts water in which 0.02 parts ammonium persulfate and 0.02 parts diammonium phosphate had been dissolved. Heat was applied to the reactor contents and, after an induction period, feeds including the following components were added over approximately 120 minutes: 27.6 parts vinyl acetate, and a mixture of 0.84 parts N-methylolacrylamide, 0.12 parts dioctyl ester of sodium sulfosuccinic acid, 0.1 parts isopropyl alcohol and 17.4 parts water. The water bath was used to control the temperature so that the polymerization proceeded from 68° C. to 85° C. over the feed additions. The first stage reaction was complete after the temperature peaked and began to fall.

Stage 2: After completion of the first stage, the reactor temperature was adjusted to 75° C. and 2.12 parts methyl methacrylate, 0.04 parts N-methylolacrylamide and 1.5 parts water were added. The second stage polymerization was initiated with the addition of 0.01 parts tert-butyl hydroperoxide and 0.08 parts sodium formaldehyde sulfoxylate rinsed in with 0.44 parts water. The reactor contents were held for thirty minutes in the temperature range of 70° C. to 75° C. and then a second and optionally third addition of tert-hydroperoxide and sodium formaldehyde sulfoxylate was added. The reactor contents were then cooled forming the two-stage emulsion polymer.

To the cooled two-stage emulsion 0.1 part buffer, 0.04 parts defoamer, 0.17 parts preservative, 0.8 parts butyl carbitol acetate, 2.0 parts phenol formaldehyde, and 2.6 parts 50% aluminum chloride hexahydrate solution (32° Baume) were added by slowly stirring the components into the emulsion.

The composition of Example 1 contained 51.5% solids and had a Brookfield viscosity 8900 cps measured on a Brookfield viscometer using spindle number 6 at 20 rotations per minute (rpm). The composition of Example 1, after aging at room temperature for four months, was visually inspected and found to be free flowing and free of coagulation.

Example 2

The composition of Example 2 was prepared following the process of Example 1 with the exception that the total amount of N-methylolacrylamide added in Stage 1 was 1.12 parts.

The composition of Example 2 passed DIN EN 204, Durability Class D4, Conditioning Sequences 1 and 3.

Example 3

The composition of Example 3 was prepared following the process of Example 1 with the exception that the total amount of N-methylolacrylamide added in Stage 1 was 1.78 parts.

The composition of Example 3 passed the Watt-91 Test Method.

Example 4

The composition of Example 4 was prepared following the process of Example 1 with the exception that the Shell VEOVA 9 was used instead of VEOVA 10 in Stage-1 and 3.2 parts of methyl methacrylate and no N-methylolacrylamide were used in Stage-2.

The composition of Example 4 passed DIN EN 204 Durability Class D4 Conditioning Sequence 5 and the Watt-91 Test Method.

Example 5

The composition of Example 5 was prepared following the process of Example 1 with the exception that 3.4 parts 50% aluminum chloride hexahydrate solution (32° Baume) was added during the compounding step.

The composition of Example 5 passed DIN EN 204 Durability Class D4, Conditioning Sequences 3 and 5.

Example 6

The composition of Example 6 was prepared following the process of Example 1 with the exception that 1.65 parts hydroxyethyl cellulose was used instead of 2.8 parts polyvinyl alcohol, 9.0 parts VEOVA 9 and 6.1 parts vinyl acetate were added in the induction step of Stage-1, and 3.2 parts of methyl methacrylate and 0.07 parts N-methylolacrylamide were used in Stage 2.

The composition of Example 6 passed DIN EN 204 Durability Class D4, Conditioning Sequence 5 and the Watt-91 Test Method.

Example 7

The composition of Example 7 was prepared following the process of Example 1 and then stored in a sealed container for two weeks at 95° F., which was the equivalent of aging for six months at room temperature.

The aged composition of Example 7 was visually inspected and found to be free flowing and free of coagulation. The composition of Example 7 also passed DIN EN 204 Durability Class D4 Conditioning Sequence 5 and the WATT-91 Test Method.

Example 8

The composition of Example 8 was prepared following the process of Example 1 and then the composition was stored at 120° F. for two weeks, which was the equivalent of aging for one year at room temperature.

The aged composition of Example 8 was visually inspected and found to be free flowing and free of coagulation. The composition of Example 8 also passed DIN EN 204 Durability Class D4 Conditioning Sequence 5 and the WATT-91 Test Method.

Example 9

The composition of Example 9 was prepared following the process of Example 2 and then the composition was store in a sealed container for two weeks at 95° F., which was the equivalent of aging for six months at room temperature.

The aged composition of Example 9 was visually inspected and found to be free flowing and free of coagulation. The composition of Example 9 also passed DIN EN 204 Durability Class D4 Conditioning Sequences 3 and 5 and the WATT-91 Test Method.

Example 10

The adhesive composition of Example 2 when stored at room temperature for four months was found upon visual inspection to be free flowing and free of coagulation.

Example 11

The adhesive composition of Example 1 was tested according to the WATT-91 Test Method and passed.

Example 12

The adhesive composition of Example 3 was tested in accordance with the DIN EN 204 Test Method Durability Class D4 Conditioning Sequences 1, 3 and 5 and passed.

Example 13

The adhesive composition of Example 5 was tested in accordance with the WATT-91 Test Method and passed.

Example 14

The adhesive composition of Example 1, was tested in accordance with DIN EN 204 Test Method Durability Class D4 Conditioning Sequences 1, 3 and 5 and passed.

Example 15

The adhesive composition of Example 3 was inspected after having been stored in a sealed container at room temperature for four months and found to be free flowing and free of coagulation

Example 16

The adhesive composition of Example 2 was tested in accordance with the WATT-91 Test Method and passed.

Example 17

The first stage polymer emulsion was prepared by adding the following components to a glass reactor equipped with a water bath for heating and cooling, an agitator, a condenser and appropriate feed apparatus: 25.0 parts of deionized water, 0.45 parts 88% hydrolysis polyvinyl alcohol, 1.13 parts CELLOSIZE QP-300 buffer (Dow Chemical Co, Midland, Mich.) and defoamer. The reactor was heated until the polyvinyl alcohol was fully dissolved and then the temperature was adjusted to 65° C. The polymerization was initiated with the addition of 10.6 parts vinyl acetate, 4.5 parts VEOVA 10 vinyl ester of a 10 carbon neo-acid (Shell Chemical Company Houston, Tex.), 0.80 parts N-methylolacrylamide, 0.06 parts dioctyl ester of sodium sulfosuccinic acid (Cytec West Paterson, N.J.) and 0.5 parts water in which 0.02 parts ammonium persulfate and 0.02 parts diammonium phosphate had been dissolved. Heat was applied to the reactor contents and, after an induction period, feeds including the following components were added over approximately 120 minutes: 27.6 parts vinyl acetate, and a mixture of 1.0 parts N-methylolacrylamide, 0.12 parts dioctyl ester of sodium sulfosuccinic acid, 0.1 parts isopropyl alcohol and 15.9 parts water. The water bath was used to control the temperature so that the polymerization proceeded from 68° C. to 85° C. over the feed additions. The first stage reaction was complete after the temperature peaked and began to fall.

After completion of the first stage, the reactor temperature was adjusted to 75° C. and 2.12 parts methyl methacrylate, 0.04 parts N-methylolacrylamide and 1.5 parts water were added. The second stage polymerization was initiated with the addition of 0.01 parts tert-butyl hydroperoxide and 0.08 parts sodium formaldehyde sulfoxylate rinsed in with 0.44 parts water. The reactor contents were held for thirty minutes in the temperature range of 70° C. to 75° C. and then a second addition of tert-hydroperoxide and sodium formaldehyde sulfoxylate was added. The reactor contents were then cooled forming the two-stage emulsion polymer.

To the cooled two-stage emulsion 0.1 part buffer, 0.04 parts defoamer, 0.17 parts preservative, 0.8 parts butyl carbitol acetate, 2.0 parts AROFENE 72155-W-55 phenol formaldehyde (Ashland Chemical Company, Columbus, Ohio), 1.5 parts methanol and 2.6 parts aluminum chloride were added by slowly stirring the components into the emulsion.

The composition of Example 17 passed DIN EN 204 Test Method, Durability Class D4, Conditioning Sequences 1, 3 and 5, and Watt-91 Test Method.

After having been stored at 35° C. for two weeks the sample was found, upon visual inspection, to be free flowing and free of coagulation.

Other embodiments are within the claims.

What is claimed is:

1. A one part adhesive composition comprising:
   a) an emulsion comprising a multi-stage polymer comprising
      a first stage polymer having a Tg from −20° C. to 90° C. and comprising from about 0.5% by weight to about 3% by weight latent crosslinking monomer based on the first stage monomer weight,
      a second stage polymer having a Tg from 40° C. to 140° C., said second stage polymer being different from said first stage polymer;
   b) formaldehyde-based crosslinking agent; and
   c) catalyst,
   said adhesive composition being capable of passing the DIN EN 204 Test Method after having been stored in a sealed container at 23° C. for at least 30 days.

2. The adhesive composition of claim 1, wherein said adhesive composition passes the WATT-91 Test Method.

3. The adhesive composition of claim 1, wherein said adhesive composition passes the WATT-91 Test Method aging in a sealed container for at least 30 days at 23° C.

4. The adhesive composition of claim 1, wherein said adhesive composition passes the WATT-91 Test Method after aging in a sealed container for at least 2 months at 23° C.

5. The composition of claim 1, wherein said adhesive composition passes the DIN EN 204 Test Method after aging in a sealed container for at least 2 months at 23° C.

6. The composition of claim 1, wherein said adhesive composition passes the WATT-91 Test Method after aging in a sealed container for at least 3 months at 23° C.

7. The composition of claim 1, wherein said adhesive composition passes the WATT-91 Test Method after aging in a sealed container for at least 6 months at 23° C.

8. The adhesive composition of claim 1, wherein said second stage polymer comprises from about 0.1% by weight to about 10% by weight latent crosslinking monomer based on the second stage monomer weight.

9. The composition of claim 1, wherein said catalyst comprises an acid catalyst.

10. The composition of claim 1, wherein said catalyst is selected from the group consisting of hydrochloric acid, sulfuric acid, phosphoric acid, p-toluene sulfonic acid, and combinations thereof.

11. The composition of claim 1, wherein said catalyst comprises Lewis acid.

12. The composition of claim 1, wherein said catalyst is selected from the group consisting of aluminum chloride, iron chloride, zirconium oxychloride, chromic nitrate, chromic perchlorate, aluminum nitrate, iron nitrate and zinc nitrate.

13. The composition of claim 1, wherein said first stage polymer has a Tg from 0° C. to 70° C.

14. The composition of claim 1, wherein said first stage polymer has a Tg from 20° C. to 50° C.

15. The composition of claim 1, wherein said first stage polymer comprises vinyl ester.

16. The composition of claim 1, wherein said first stage polymer comprises vinyl acetate.

17. The composition of claim 16, wherein said first stage polymer further comprises vinyl ester other than vinyl acetate.

18. The composition of claim 16, wherein said first stage polymer further comprises vinyl ester of versatic acid.

19. The composition of claim 1, wherein said second stage polymer has a Tg from 60° C. to 120° C.

20. The composition of claim 1, wherein said second stage polymer has a Tg from 80° C. to 120° C.

21. The composition of claim 1, wherein said second stage polymer comprises methyl methacrylate.

22. The composition of claim 1, wherein said second stage polymer comprises styrene, acrylonitrile, vinyl pivalate, or a combination thereof.

23. The composition of claim 18, wherein said second stage polymer comprises methyl methacrylate.

24. The adhesive composition of claim 1, wherein said multi-stage polymer comprises from 0.5% by weight to 60% by weight second stage polymer based on the weight of said first stage polymer.

25. The adhesive composition of claim 1, wherein said multi-stage polymer comprises from 1% by weight to about 30% by weight second stage polymer based on the weight of said first-stage polymer.

26. The adhesive composition of claim 1, wherein said multi-stage polymer comprises from 1% by weight to 10% by weight second stage polymer based on the weight of said first-stage polymer.

27. The composition of claim 1, further comprising coalescing agent, urea, alcohol, plasticizer, antifoam, filler, biocide, tackifier, fire retardant, thickener, preservative, or a combination thereof.

28. The composition of claim 1, wherein said first stage polymer comprises from about 1% by weight to about 2.5% by weight latent crosslinking monomer based on the first stage monomer weight.

29. The composition of claim 1, wherein said multi-stage polymer comprises from about 1% by weight to about 2% by weight latent crosslinking monomer based on the first stage monomer weight.

30. The composition of claim 1, wherein said formaldehyde-based crosslinking agent is selected from the group consisting of resorcinol formaldehyde, urea-formaldehyde, melamine-formaldehyde, phenol-formaldehyde, trimethylol phenol, acrylamide-formaldehyde adducts, and combinations thereof.

31. The composition of claim 1, comprising from about 1% by weight to about 10% by weight formaldehyde-based crosslinking agent.

32. The composition of claim 1, further comprising alcohol.

33. The composition of claim 1, wherein said adhesive composition passes the DIN EN 204 Test Method after aging in a sealed container for at least 6 months at 23° C.

34. The composition of claim 1, wherein said adhesive composition, after aging in a sealed container for at least 2 months at 23° C., passes the DIN EN 204 Test Method and the WATT-91 Test Method.

35. The composition of claim 1, wherein said adhesive composition, after aging in a sealed container for at least 3 months at 23° C., passes the DIN EN 204 Test Method and the WATT-91 Test Method.

36. The composition of claim 1, wherein said adhesive composition, after aging in a sealed container for at least 6 months at 23° C., passes the DIN EN 204 Test Method and the WATT-91 Test Method.

37. An article comprising:

a substrate; and the one part adhesive composition of claim 1 disposed on said substrate.

38. The article of claim 37, wherein said substrate comprises wood.

39. The article of claim 37, comprising a second substrate, said first substrate being bonded to said second substrate through said adhesive composition.

40. A method of bonding substrates, said method comprising:

a) contacting a first substrate with an adhesive composition comprising i) an emulsion comprising a multi-stage polymer comprising, a first stage polymer having a Tg from −20° C. to 90° C. and from about 0.5% by weight to about 3% by weight latent crosslinking monomer based on the first stage monomer weight, and a second stage polymer having a Tg from 40° C. to 140° C., said second stage polymer being different from said first stage polymer;

ii) formaldehyde-based crosslinking agent; and iii) catalyst, the adhesive composition having been stored in a sealed container for at least 30 days prior to said contacting; and b) contacting said adhesive composition with a second substrate.

41. The method of claim 40, further comprising applying pressure to said substrate construction to bond said first substrate to said second substrate through said adhesive composition.

42. The method of claim 40, further comprising applying heat to said substrate construction to bond said first substrate to said second substrate through said adhesive composition.

43. The method of claim 40, further comprising applying radio frequency to said substrate construction.

44. A method of bonding substrates, said method comprising:

a) contacting a first substrate with the adhesive composition of claim 1, the adhesive composition having been stored in a sealed container for at least 30 days prior to said contacting; and b) contacting said adhesive composition with a second substrate.

* * * * *